(12) United States Patent
Zhu et al.

(10) Patent No.: US 9,115,790 B2
(45) Date of Patent: Aug. 25, 2015

(54) ELECTRIC CART WITH GEAR MOTOR

(71) Applicant: Johnson Electric S.A., Murten (CH)

(72) Inventors: Xiu Hua Zhu, Shenzhen (CN); Tong Ling, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 199 days.

(21) Appl. No.: 13/864,845

(22) Filed: Apr. 17, 2013

(65) Prior Publication Data

US 2013/0274049 A1 Oct. 17, 2013

(30) Foreign Application Priority Data

Apr. 17, 2012 (CN) .......................... 2012 1 0112278

(51) Int. Cl.
*F16H 1/28* (2006.01)
*F16H 1/46* (2006.01)
*A63B 55/08* (2006.01)

(52) U.S. Cl.
CPC .. *F16H 1/28* (2013.01); *F16H 1/46* (2013.01); *A63B 55/087* (2013.01)

(58) Field of Classification Search
CPC ............ F16H 1/28; F16H 1/46; A63B 55/087
USPC ........ 475/149, 337, 344, 345; 180/65.1, 65.6, 180/65.7, 11, 16, 19.1, 19.2, 907, 908
See application file for complete search history.

(56) References Cited

U.S. PATENT DOCUMENTS

| 1,808,748 | A | * | 6/1931 | Apple ........................... 475/149 |
| 3,178,966 | A | * | 4/1965 | Wildhaber ..................... 475/149 |
| 5,762,154 | A | * | 6/1998 | Hsu ................................. 180/15 |
| 7,556,580 | B2 | * | 7/2009 | Saito et al. ..................... 475/154 |
| 7,845,445 | B2 | * | 12/2010 | Cooper et al. .................. 475/337 |
| 8,376,901 | B2 | * | 2/2013 | Riester et al. .................. 475/331 |
| 2009/0000840 | A1 | * | 1/2009 | Murata ........................ 180/65.5 |
| 2011/0209934 | A1 | * | 9/2011 | Armbruster et al. .......... 475/149 |
| 2012/0103708 | A1 | * | 5/2012 | Hennings et al. ............. 180/65.6 |
| 2013/0252781 | A1 | * | 9/2013 | Hagedorn ...................... 475/337 |
| 2015/0105207 | A1 | * | 4/2015 | Hagedorn et al. ............. 475/149 |
| 2015/0105208 | A1 | * | 4/2015 | Hagedorn et al. ............. 475/149 |

FOREIGN PATENT DOCUMENTS

DE 10251499 A1 5/2004

OTHER PUBLICATIONS

D.C. Hanselman, Effect of skew, pole count and slot count on brushless motor radial force, cogging torque and back EMF, Sep. 1997, IEEE, Proc.- Electr. Power Appl., vol. 144, No. 5.*

* cited by examiner

*Primary Examiner* — Jacob S Scott
(74) *Attorney, Agent, or Firm* — Muncy, Geissler, Olds & Lowe, P.C.

(57) ABSTRACT

The electric cart has a main body, wheels at the bottom of the main body and a gear motor to electrically drive the wheels. The gear motor includes a motor having a motor shaft, an output shaft connected to at least one of the wheels, and a gear reduction unit connecting the motor shaft to the output shaft. The gear reduction unit has a helical gear train.

18 Claims, 3 Drawing Sheets

ELECTRIC CART WITH GEAR MOTOR

CROSS REFERENCE TO RELATED APPLICATIONS

This non-provisional patent application claims priority under 35 U.S.C. §119(a) from Patent Application No. 20121011278.9 filed in The People's Republic of China on Apr. 17, 2012.

FIELD OF THE INVENTION

This invention relates to an electric cart, especially a baby stroller, and in particular, to a gear motor of the electric cart.

BACKGROUND OF THE INVENTION

Traditional carts including strollers are manually operated. It is not easy to push a stroller uphill or to push a stroller while carrying other goods. To overcome such difficulties electric strollers were provided. Electric strollers are equipped with an electric motor for driving the stroller and electric switches to control the motor. A known electric stroller uses a gear motor which is directly coupled to a drive wheel of the stroller. However, the gear motor is noisy and makes the baby feel uncomfortable.

SUMMARY OF THE INVENTION

Hence, there is a desire for an electric stroller or cart with a gear motor that has reduced noise.

The concept of the gear motor may be applied to many types of wheeled devices and the term cart is used as a generic term to cover such wheeled devices and specifically covers, hand carts, golf carts, wheel chairs, baby carriages, strollers and prams.

Accordingly, in one aspect thereof, the present invention provides an electric cart comprising: a main body; wheels arranged at the bottom of the main body; and a gear motor arranged to drive at least one of the wheels, the gear motor comprising: a motor having a motor shaft; an output shaft connected to said at least one wheel; and a gear reduction unit connecting the motor shaft to the output shaft, wherein the gear reduction unit comprises a helical gear train.

Preferably, the helical gear train is a planetary gear train comprising a sun gear with helical gear teeth, a ring gear surrounding the sun gear and having helical inner teeth, and planetary gears rotatably supported by a carrier; the planetary gears are meshed between the helical teeth of the sun gear and the helical inner teeth of the ring gear.

Preferably, the inclination angle of the helical teeth in the helical gear train is from 8 degrees to 20 degrees.

Preferably, the planetary gears are made of plastic and the sun gear and the ring gear are made of metal.

Preferably, the sun gear is fixed to the motor shaft.

Preferably, a mounting plate is fixed to the motor and the ring gear is connected to the mounting plate by radial screws.

Preferably, the gear reduction unit comprises a first stage planetary gear and a second stage planetary gear and wherein the first stage planetary gear is a helical gear train and the second stage planetary gear is a spur gear train.

Preferably, the motor is a brushless direct current motor, comprising a stator having stator windings and a rotor having rotor poles formed by permanent magnets.

Preferably, the rotor poles are skewed poles.

Preferably, the gear reduction unit comprises a duplex bearing that is seated in a bearing holder to rotatably support the output shaft.

The present invention provides a gear motor for electric carts, comprising a motor having a motor shaft, an output shaft directly or indirectly connected to a wheel of the cart, and a gear reduction unit connecting the motor shaft to the output shaft: the gear reduction unit comprises a helical gear train.

In the embodiments of the present invention, the meshing surface of helical gears is large, and the meshing of teeth is a gradually contact process. Therefore, the noise of the gear motor is reduced.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 5:
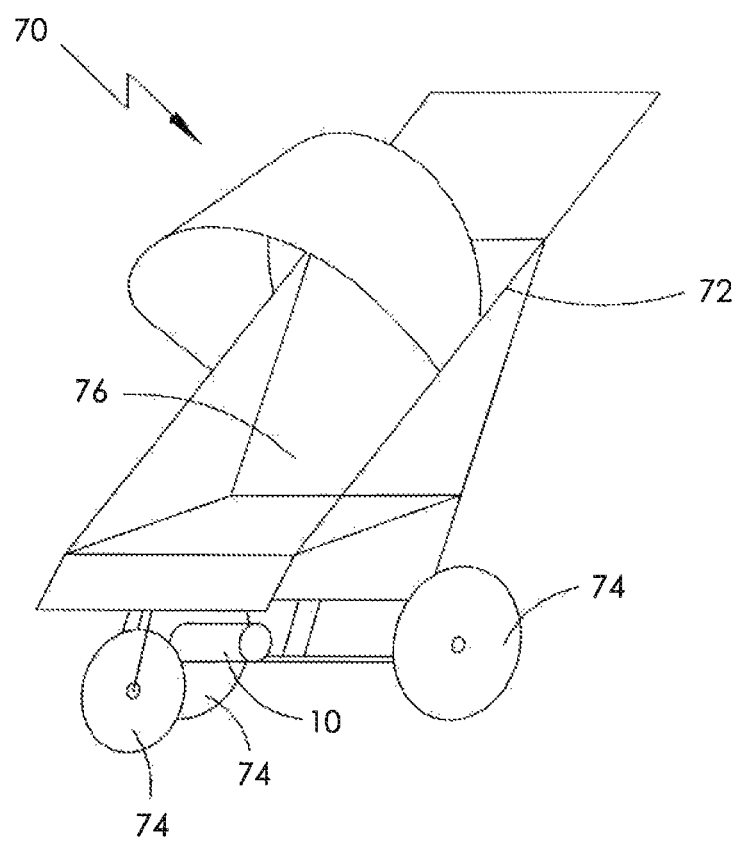
FIG. 5 illustrates a stroller incorporating the gear motor of FIG. 1.

An electric cart 70, in the form of a baby stroller, according to an exemplary embodiment of the present invention, is shown in FIG. 5. The cart comprises a main body 72, wheels 74 arrayed at the bottom of the main body, and a gear motor 10 for electrically driving at least one of the wheels. A compartment 76 is supported by the main body 72.

Referring to the Figures, the gear motor 10 comprises a motor 14 having a motor shaft 12, an output shaft 16 directly or indirectly connected to a wheel of the cart, and a gear box or gear reduction unit 18.

Preferably, the motor 14 is a brushless direct current (BLDC) motor, comprising a stator having stator windings and a rotor having permanent magnet rotor poles. Preferably, the rotor poles are skewed poles. Since the brushless direct current motor does not use a commutator and brushes, noise normally created by the brushes sliding on the commutator is avoided. The rotor poles are configured as skewed poles to lower the cogging torque of the motor. As such, when the electric motor is powered off, the resistance on the wheels is reduced, meaning that it takes less force to manually push the cart.

In this embodiment, the gear reduction unit 18 comprises a planetary gear train including a first stage planetary gear and a second stage planetary gear arranged axially in the direction of the motor shaft 12. The first stage planetary gear comprises a first sun gear 24, a first planetary gear set 26, a first carrier 28 carrying the first planetary gear set, and a first ring gear 30. The second stage planetary gear comprises a second sun gear 32 carried by the first carrier 28, a second planetary gear set 34, a second carrier 36 carrying the second planetary gear set, and a second ring gear 38. The output shaft 16 is rotatably supported by a duplex bearing 42 seated in a bearing holder 40 and fixed to rotate with the second carrier 36.

A mounting plate 44 is arranged between the gear reduction unit 18 and the motor 14. The mounting plate 44 is fixed to the motor 14 by screws 46. The mounting plate 44, first ring gear 30, second ring gear 38 and bearing holder 40 are fixed one by one in the axial direction of the motor shaft 12, and thus conjointly form a housing of the gear reduction unit 18. The mounting plate 44, first ring gear 30, second ring gear 38 and bearing holder 40 are partially overlapped one by one in the radial direction. Fitting holes are formed in the radially overlapped portions and the corresponding overlapped members are fixed together by radial fitting pins or screws.

Figure 1:
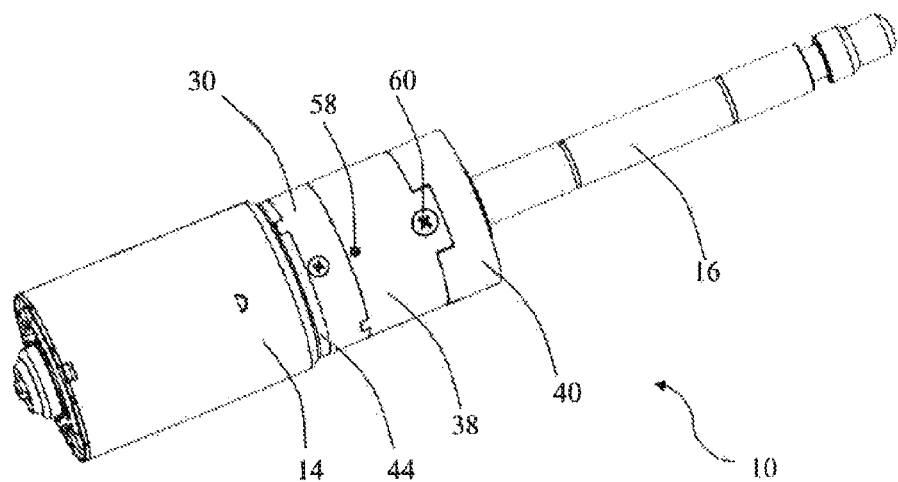
FIG. 1 illustrates a gear motor of a stroller according to an exemplary embodiment of the present invention.
Figure 2:
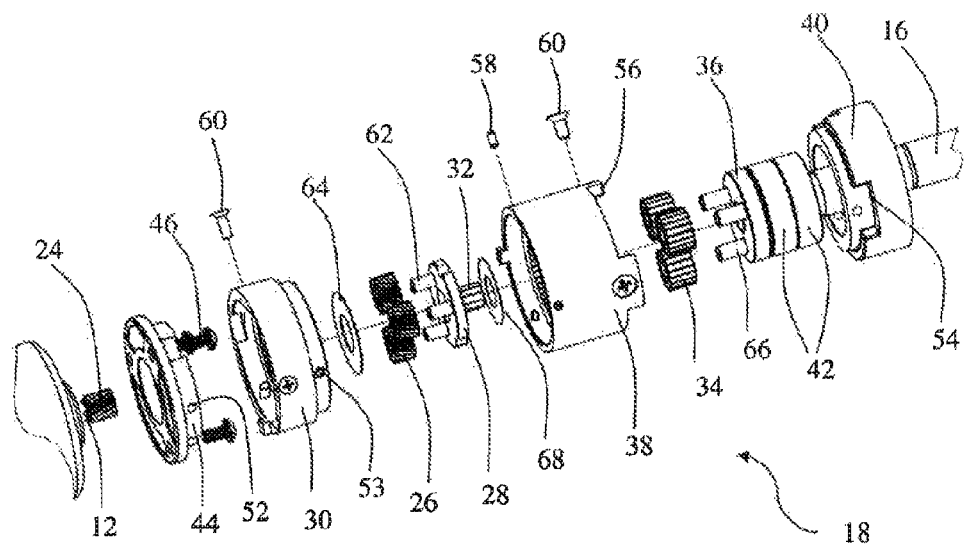
FIG. 2 is an exploded view of the gear box of the motor of FIG. 1.
Figure 3:
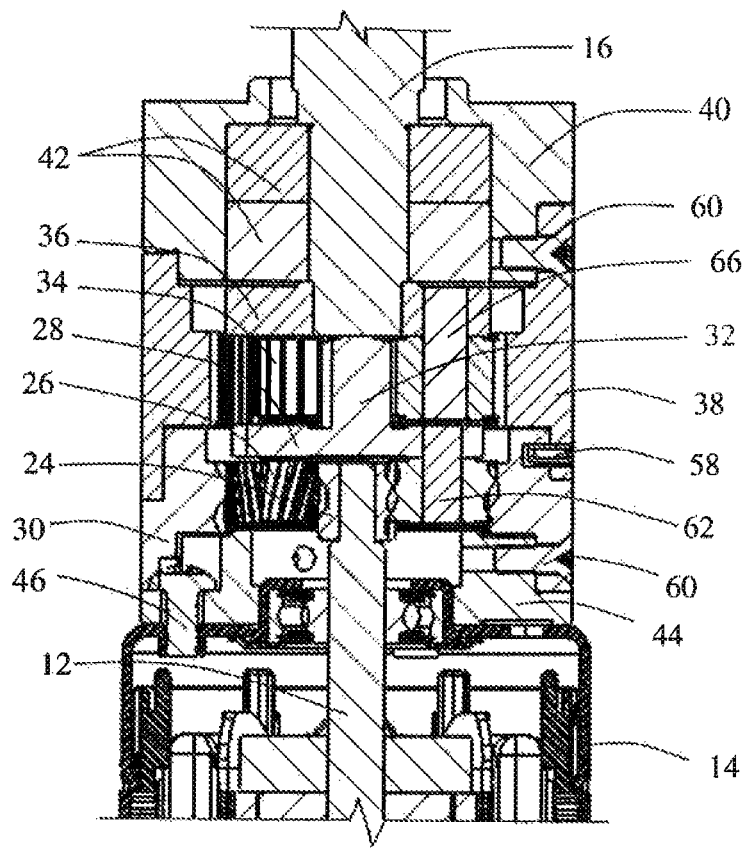
FIG. 3 is a sectional view of the gear box of FIG. 2.
Figure 4:
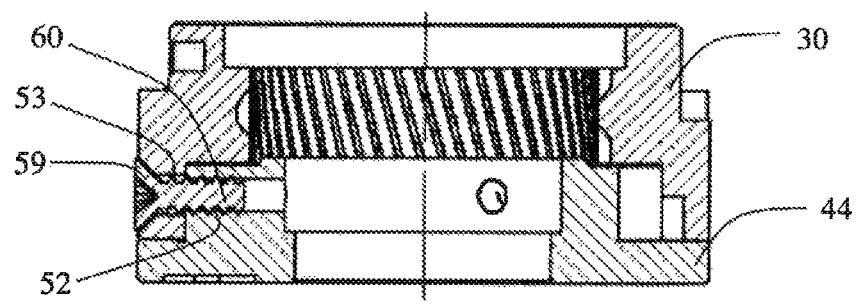
FIG. 4 is an enlarged sectional view of a part of the gear box of FIG. 2.

Concave-convex bayonet fitting structures 54, 56 are formed so that the radially overlapped members can be circumferentially aligned and the circumferential displacement is limited. Preferably, the fitting pins that connect the first ring gear 30 and the second ring gear 38 are "C" shaped tension pins 58. As shown in FIG. 4, the fitting pins that connect the mounting plate 44 and the first ring gear 30 are screws 60, thus to ensure the detachability during the manufacturing process. The fitting holes 52 in the mounting plate 44 are threaded holes. The fitting holes 53 in the first ring gear 30 are unthreaded. The fitting holes 53 comprises bevel surface that is in contact with the head portion 59 of the screw 60 to facilitate the insertion of the screw 60. Similarly, the second ring gear 38 and the bearing seat 40 are fixed together by screws 60.

In this embodiment, each of the planetary gear sets 26 and 34 comprise three planetary gears. The first sun gear 24 is fixed to and rotates with the motor shaft 12. The motor shaft 12 and the first sun gear 24, pass through a central hole formed in the mounting plate 44. The planetary gears of the first planetary gear set 26 are respectively fixed to mounting spigots 62 that extend from the first carrier 28 in the axial direction of the motor 14. The planetary gears of the first planetary gear set 26 are received between the first ring gear 30 and the first sun gear 24 and mesh with inner teeth of the first ring gear 30 and teeth of the first sun gear 24. A first friction plate 64 is disposed between the mounting plate 44 and the first planetary gear set 26 to decrease the friction between the first planetary gear set 26 and the mounting plate 44.

The second sun gear 32 is mounted to the first carrier 28 on the side remote from the motor 14, and rotates with the first carrier 28. The second carrier 36 faces the first carrier 28. The planetary gears of the second planetary gear set 34 are respectively fixed to mounting spigots 66 that extend from the second carrier 36 towards the first carrier 28. The planetary gears of the second planetary gear set 34 are received between the second ring gear 38 and the second sun gear 32 and mesh with inner teeth of the second ring gear 38 and teeth of the second sun gear 32. A second friction plate 68 is disposed between the first carrier 28 and the second planetary gear set 34 to decrease the friction between the first carrier 28 and the second planetary gear set 34. The output shaft 16 is mounted to a central hole formed in the second carrier 36 and rotates with the second carrier 36.

In this embodiment, the first stage planetary gear is a helical gear train. That is, the teeth of the first sun gear 24, the teeth of the first planetary gear set 26 and the inner teeth of the first ring gear 30 are all helical teeth. The inclination angle of the helical teeth may range from 8 degrees to 20 degrees. Preferably, the inclination angle of the helical teeth is 16 degrees. Because, of the helical teeth, the meshing surface is increased, and the meshing is a gradual contact process. Therefore, the noise is lowered. The first sun gear 24 is made of metal, preferably steel, and the first planetary gear set 26 is made of plastic. The first ring gear 30 is made by sintered powder metallurgy. Since the rigidity of the material of the first planetary gear set 26 is different from the rigidity of material of the first sun gear 24 and the first ring gear 30, the gear teeth noise is lowered while the mechanical strength is ensured.

Preferably, the second stage planetary gear is a spur gear train. The second sun gear 32, second planetary gear set 34 and second ring gear 38 are made by sintered powder metallurgy, so that the mechanical strength is large enough to endure the required torque loading. As the second stage planetary gear rotates at a slower speed than the first stage planetary gear, the noise produced by the spur gears of the second stage planetary gear is acceptable.

According to test results, the noise of an electric cart could be lowered to 31 dB to 33 dB by equipping one gear motor according to one exemplary embodiment of the present invention. The noise could be lowered to 36 dB by equipping two gear motors.

While the preferred embodiment described has a single motor driving a single wheel, there could be two motors, each driving a respective wheel or a single gear motor driving two wheels, preferably the two rear wheels.

Although the invention is described with reference to one or more preferred embodiments, it should be appreciated by those skilled in the art that various modifications are possible. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. An electric cart comprising:
   a main body;
   wheels arranged at the bottom of the main body; and
   a gear motor arranged to electrically drive at least one of the wheels, the gear motor comprising: a motor having a motor shaft; an output shaft directly or indirectly connected to said at least one wheel; and a gear reduction unit connecting the motor shaft to the output shaft, wherein the gear reduction unit comprises a helical gear train,
   wherein the gear reduction unit further comprises two bearings that are seated in only one bearing holder to rotatably support the output shaft, the two bearings directly face and adjacent to each other,
   wherein the helical gear train is a planetary gear train comprising, a sun gear with helical gear teeth, a ring gear surrounding the sun gear and having helical inner teeth, and planetary gears rotatably supported by a carrier; the planetary gears are meshed between the helical teeth of the sun gear and the helical inner teeth of the ring gear, and
   wherein the gear reduction unit comprises a first stage planetary gear and a second stage planetary gear and wherein the first stage planetary gear is a helical gear train and the second stage planetary gear is a spur gear train.

2. The electric cart of claim 1, wherein the inclination angle of the helical teeth in the helical gear train is from 8 degrees to 20 degrees.

3. The electric cart of claim 1, wherein the planetary gears are made of plastic and the sun gear and the ring gear are made of metal.

4. The electric cart of claim 1, wherein the motor is a brushless direct current motor, comprising a stator having stator windings and a rotor having rotor poles formed by permanent magnets.

5. The electric cart of claim 4, wherein the rotor poles are skewed poles.

6. The electric cart of claim 1, wherein the sun gear is fixed to the shaft of the motor.

7. The electric cart of claim 1, wherein the gear motor comprises a mounting plate fixed to the motor and the ring gear is connected to the mounting plate by radial screws.

8. The electric cart of claim 1, wherein the gear reduction unit further comprises concave-convex bayonet fitting structures formed on the ring gear of the second stage planetary gear and the bearing holder along an axle direction, the concave-convex bayonet fitting structures are used to limit a circumferential displacement between the ring gear of the second stage planetary gear and the bearing holder.

9. A gear motor for electric carts, comprising a motor having a motor shaft, an output shaft arranged to be connected to at least one wheel of the electric cart, and a gear reduction unit connecting the motor shaft to the output shaft, wherein the gear reduction unit comprises a helical gear train, wherein the gear reduction unit further comprises two bearings that are seated in only one bearing holder to rotatably support the output shaft, the two bearings directly face and adjacent to each other, wherein the helical gear train is a planetary gear train comprising a sun gear with helical teeth, a ring gear surrounding the sun gear and having helical inner teeth, and planetary gears rotatably supported by a carrier and having helical teeth, wherein the planetary gears are meshed between the helical teeth of the sun gear and the helical inner teeth of the ring gear, and wherein the gear reduction unit comprises a first stage planetary gear and a second stage planetary gear and wherein the first stage planetary gear is a helical gear train and the second stage planetary gear is a spur gear train.

10. The gear motor of claim 9, wherein the inclination angle the helical teeth in the helical gear train is from 8 degrees to 20 degrees.

11. The gear motor of claim 9, wherein the planetary gears are made of plastic and the sun gear and the ring gear are made of metal.

12. The gear motor of claim 9, wherein the motor is a brushless direct current motor, comprising a stator having stator windings and a rotor having rotor poles formed by permanent magnets.

13. The gear motor of claim 12, wherein the rotor poles are skewed poles.

14. The gear motor of claim 9, wherein the sun gear is fixed to the shaft of the motor.

15. The gear motor of claim 9, wherein the gear motor comprises a mounting plate fixed to the motor and the ring gear is connected to the mounting plate by radial screws.

16. The electric cart of claim 9, wherein the gear reduction unit further comprises concave-convex bayonet fitting structures formed on the ring gear of the second stage planetary gear and the bearing holder along an axle direction, the concave-convex bayonet fitting structures are used to limit a circumferential displacement between the ring gear of the second stage planetary gear and the bearing holder.

17. An electric cart comprising:
a main body;
wheels arranged at the bottom of the main body; and
a gear motor arranged to electrically drive at least one of the wheels, the gear motor comprising: a motor having a motor shaft; an output shaft directly or indirectly connected to said at least one wheel and a gear reduction unit connecting the motor shaft to the output shaft, wherein the gear reduction unit comprises a helical gear train, wherein the gear reduction unit further comprises two bearings that are seated in only one bearing holder to rotatably support the output shaft, the two bearings directly face and adjacent to each other, wherein the helical gear train is a planetary gear train comprising a sun gear with helical gear teeth, a ring gear surrounding the sun gear and having helical inner teeth, and planetary gears rotatably supported by a carrier; the planetary gears are meshed between the helical teeth of the sun gear and the helical inner teeth of the ring gear, and wherein the gear motor comprises a mounting plate fixed to the motor and the ring gear is connected to the mounting plate by radial screws.

18. A gear motor for electric carts, comprising a motor having a motor shaft, an output shaft arranged to be connected to at least one wheel of the electric cart, and a gear reduction unit connecting the motor shaft to the output shaft, wherein the gear reduction unit comprises a helical gear train, wherein the gear reduction unit further comprises two bearings that are seated in only one bearing holder to rotatably support the output shaft, the two bearings directly face and adjacent to each other, wherein the helical gear train is a planetary gear train comprising a sun gear with helical teeth, a ring gear surrounding the sun gear and having helical inner teeth, and planetary gears rotatably supported by a carrier and having helical teeth, wherein the planetary gears are meshed between the helical teeth of the sun gear and the helical inner teeth of the ring gear, and wherein the gear motor comprises a mounting plate fixed to the motor and the ring gear is connected to the mounting plate by radial screws.

* * * * *